No. 650,279.  
A. SMITH.  
WRAPPING MACHINE.  
(Application filed Nov. 11, 1899.)  
(No Model.)
Patented May 22, 1900.
7 Sheets—Sheet 1.
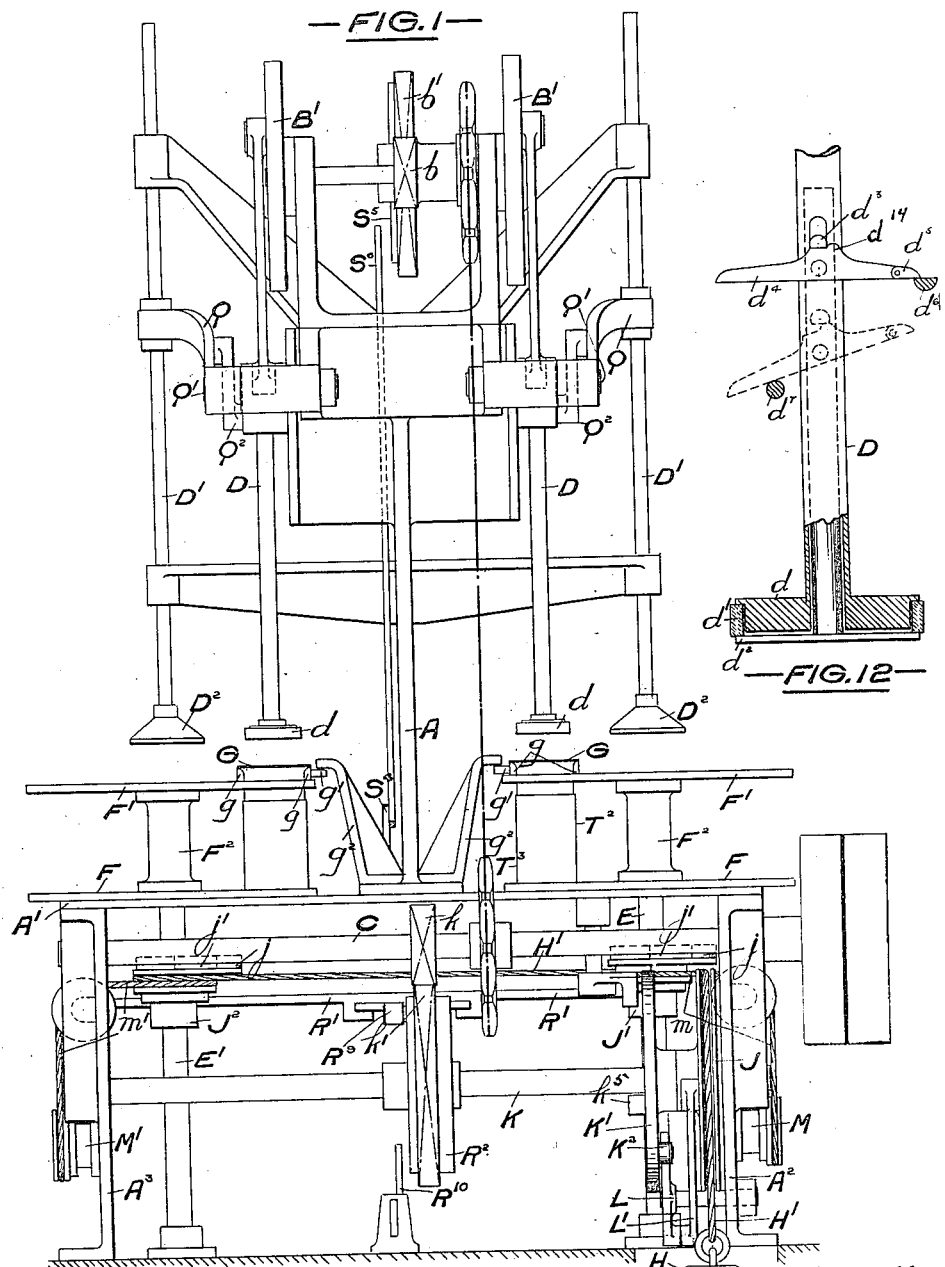
WITNESSES:
INVENTOR  
Arthur Smith  
BY  
ATTORNEYS

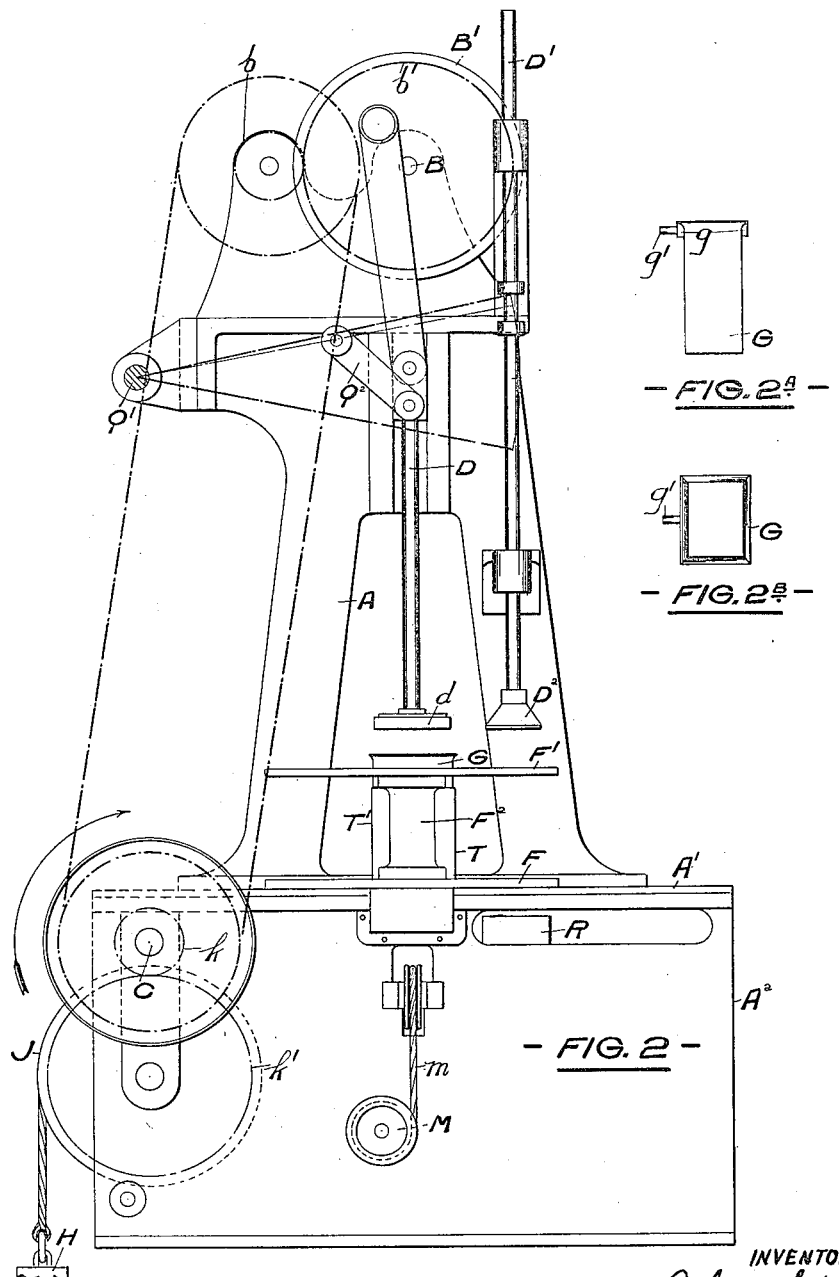

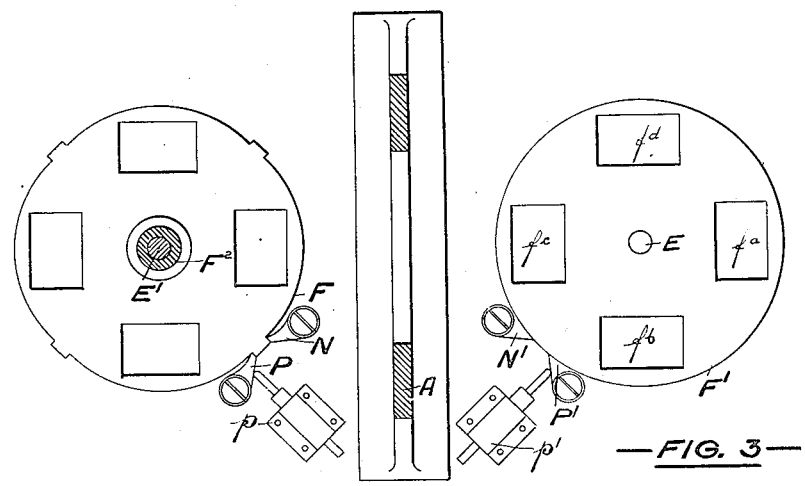
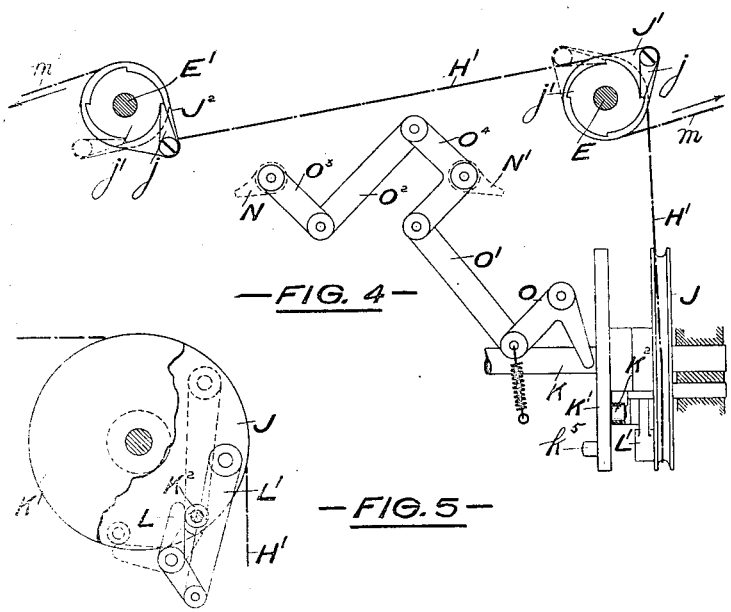

No. 650,279. Patented May 22, 1900.
A. SMITH.
WRAPPING MACHINE.
(Application filed Nov. 11, 1899.)
(No Model.) 7 Sheets—Sheet 4.
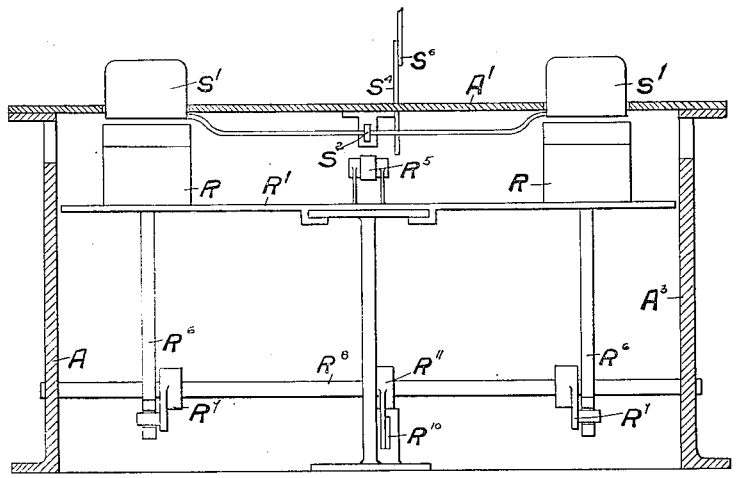
FIG. 7
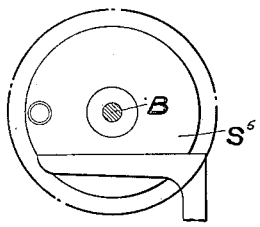
FIG. 6
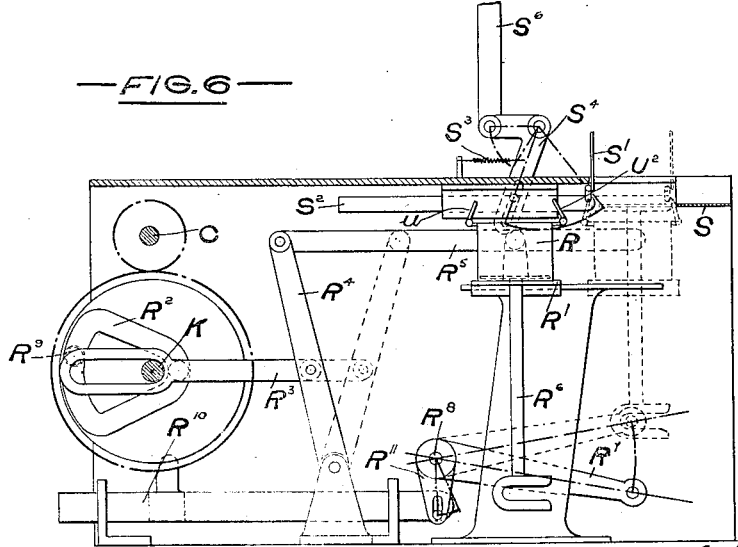
WITNESSES:
INVENTOR
Arthur Smith
BY
ATTORNEYS

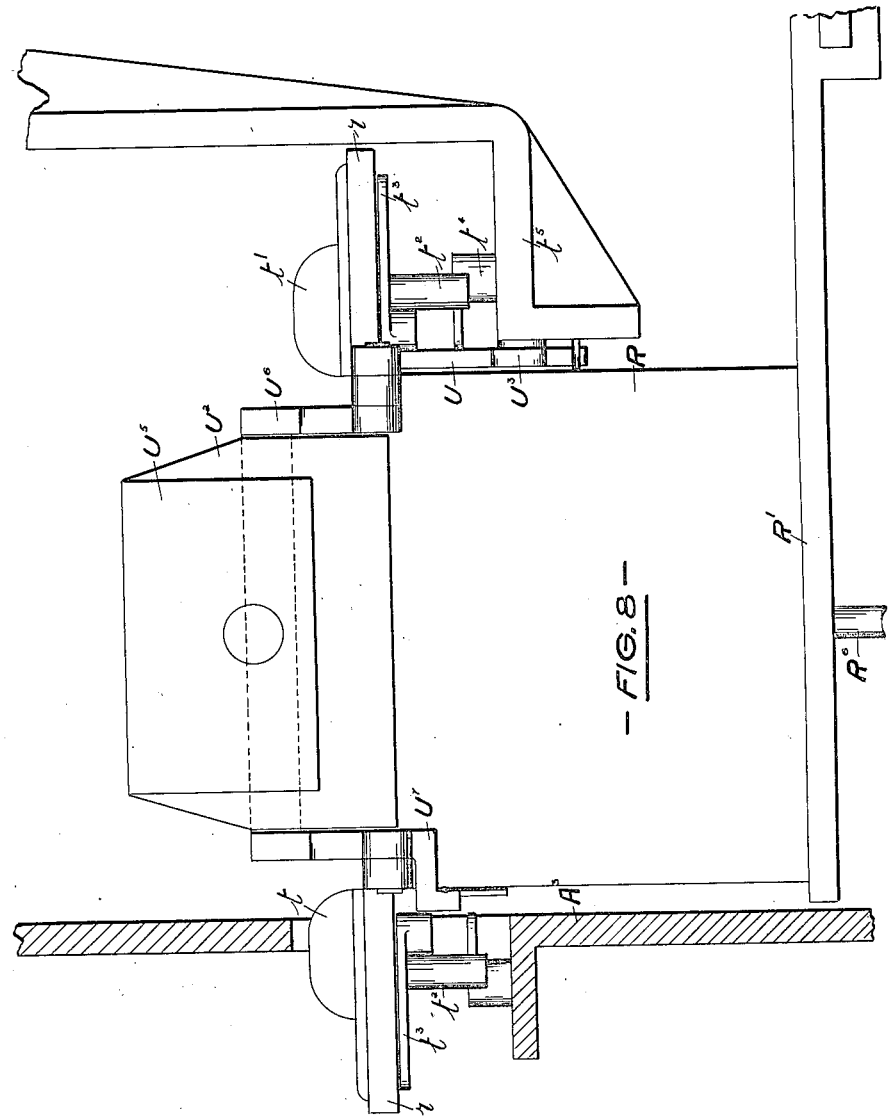

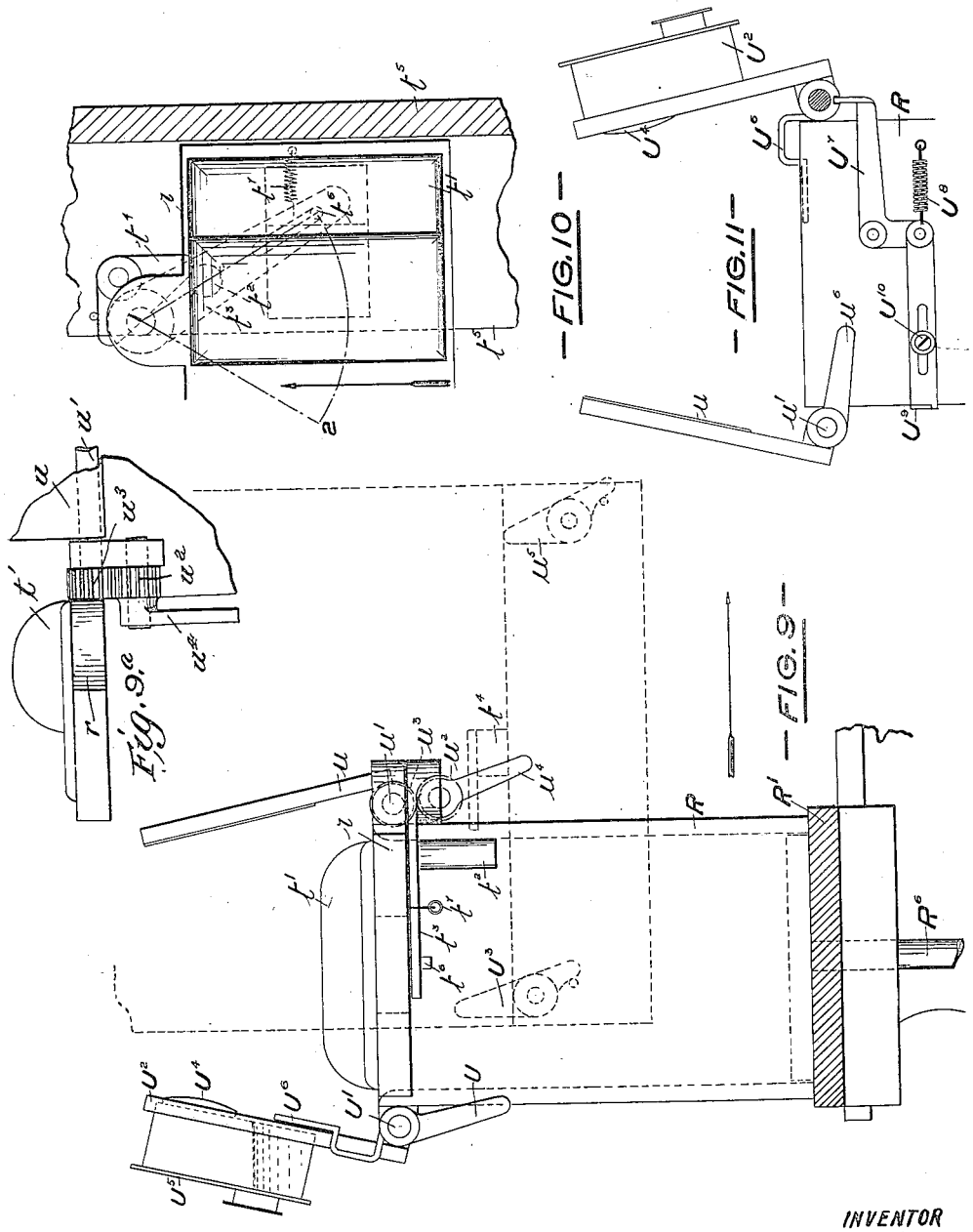

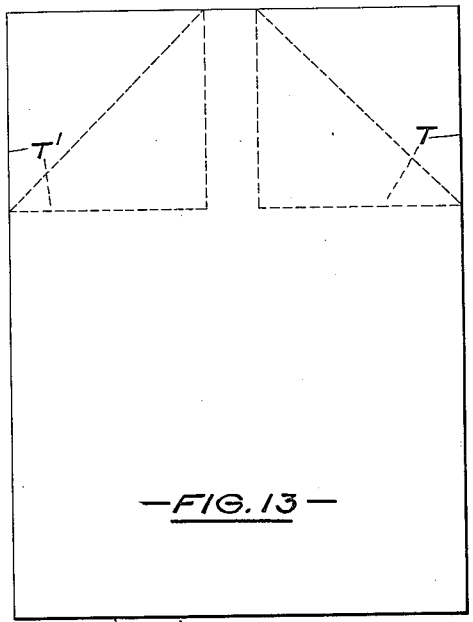
FIG. 13
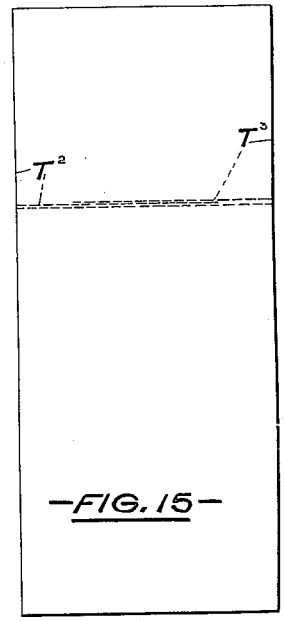
FIG. 15
FIG. 14
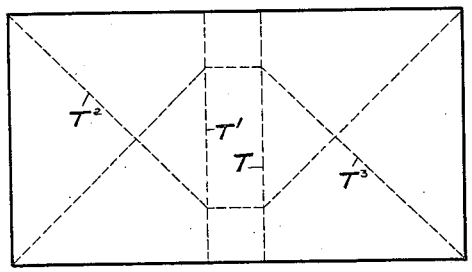
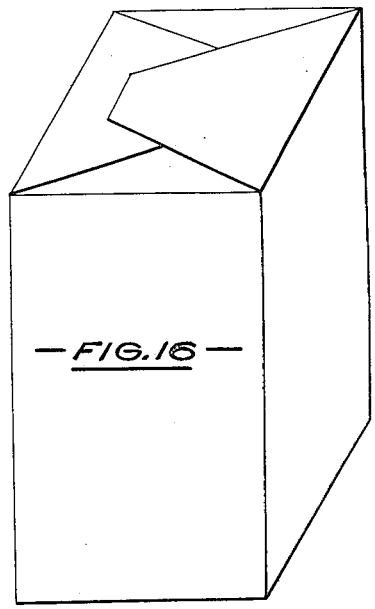
FIG. 16

UNITED STATES PATENT OFFICE.

ARTHUR SMITH, OF HANDSWORTH, ENGLAND.

WRAPPING-MACHINE.

SPECIFICATION forming part of Letters Patent No. 650,279, dated May 22, 1900.

Application filed November 11, 1899. Serial No. 736,621. (No model.)

*To all whom it may concern:*

Be it known that I, ARTHUR SMITH, a subject of the Queen of Great Britain and Ireland, and a resident of 176 Oxhill road, Handsworth, in the county of Stafford, England, have invented certain new and useful improvements in machines and appliances for the packing of powdered or like substances in paper or other bags or receptacles, (for which I have filed an application in Great Britain, No. 5,495, bearing date March 14, 1899,) of which the following is a specification.

My invention has for its object the construction of convenient and effective machines and appliances whereby powdered or like substances can be readily packed in the required quantities in paper or other bags or receptacles.

The seven accompanying sheets of explanatory drawings, to be hereinafter referred to, illustrate my invention.

Figure 1 is a side elevation, and Fig. 2 an end elevation, representing a machine constructed in accordance with my invention. Fig. $2^A$ is an elevation, and Fig. $2^B$ a plan, of one of the bag-shells or metallic liners. Fig. 3 is a plan showing different portions of the pair of rotatable tables, and Fig. 4 a plan of the table-operating mechanism. Fig. 5 is an elevation of the mechanism for raising the table-operating weight. Fig. 6 is an end elevation, and Fig. 7 a side elevation, showing the ejecting mechanism. Fig. 8 is a side elevation, and Fig. 9 an end elevation, showing, to a larger scale, a bag-closing mechanism. Fig. $9^A$ is a detail view. Fig. 10 is a plan of a portion of the said closing mechanism, and Fig. 11 an end elevation of another portion of the same. Fig. 12 is a diagrammatic sectional elevation showing the arrangement of parts for effecting the automatic expansion of the compression-plunger packing-ring. Fig. 13 is a side elevation, Fig. 14 a plan, and Fig. 15 an end elevation, of a bag or package, showing the various stages in the folding and closing of its upper end. Fig. 16 is an isometric view of the completed package.

The same reference-letters in the different views indicate the same parts.

In constructing a duplex machine such as illustrated in accordance with my invention for the packing of powdered sheep-dip or other substances into paper or other bags or receptacles I mount a vertical frame or upright A on a bed-plate or platform A', supported on standards $A^2$ $A^3$, such parts being preferably made of cast-iron. On each side of the frame or upright A are arranged guides for the compression-plunger rod and the ejecting-rod, to be hereinafter described, the machine being provided with a duplex set of such rods, which are reciprocated by a pair of crank-disks B', formed with or secured to a shaft B, running in bearings formed in or bolted to the upper end of the frame or upright A. The said shaft B is driven, preferably, through spur-wheels $b$ $b'$ by chain-gearing, as shown, from the main or first-motion shaft C, beneath the platform A' of the machine.

Beneath each pair of reciprocating rods D D', I mount on a vertically-disposed pin or shaft, as E and E', a rotatable table consisting of a pair of circular plates F F', preferably of cast-iron, placed one above the other and connected together by a central boss $F^2$, which is fixed upon the pin or shaft E or E'. Through each of the plates F F' of the rotatable tables I form equally-spaced apertures, preferably four in number, for the reception of the bags into which the substance is to be packed and the shells or metal liners, as G, over which the bags are drawn for the charging or packing operation. The shells or liners are open at the top and bottom; but the bottoms of the bags drawn over the liners serve to prevent the substance charged into them from falling through. The upper ends of the shells or liners are slightly bell-mouthed, as shown, and to support them upon the upper plates of the rotatable tables they are provided with the abutment-pieces $g$, one of such pieces on each shell having an extension or projecting lug $g'$, which by contact with the stop-bracket $g^2$, fixed to the base of the upright A, prevents withdrawal of the liner on the return movement of the compression-plunger rod D.

The rotation of each of the tables is effected by the descent at the proper time of the weight H. The weight-suspension cord or chain H' is carried over and grips or engages the wheel or pulley J and from thence passes to and grips or engages the sheave-like pawl plates or arms J' and J², loosely mounted on the vertical shafts E and E', respectively. On each of the said plates or arms J' and J², I pivot a spring pawl or ratchet, as $j$, which engages a ratchet-wheel $j'$. Each of the shafts E and E' has such a ratchet-wheel $j'$ fixed thereon.

The wheel or pulley J is mounted loosely upon a shaft K, supported in the standards $A^2 A^3$, the said shafts being driven by the spur-wheels $k\ k'$ from the main or first-motion shaft C of the machine. Adjacent to the wheel or pulley J, I fix on the shaft K a disk K', having a laterally-projecting pin $K^2$, which, on the rotation of the disk K', operates the bell-crank lever L, pivoted to the standard $A^2$, and as one end of the said lever is jointed to the link L', connected to the pulley J, a rotary movement is imparted to the said pulley sufficient to raise the weight H to a position in readiness for the operation (on its subsequent descent) of the table mechanism hereinbefore described. A portion of the disk K' is represented as broken away at Fig. 5 in order the more clearly to show the arrangement of the parts between such disk and the pulley J. The full lines at Fig. 5 represent the positions of the bell-crank lever L and connecting-link L' before the raising of the weight, while the dotted lines represent the positions of such parts after the raising of the weight H.

During the raising of the weight H no movement is imparted to the tables mounted on the shafts E and E', as the pawls $j$ slip over the teeth of the ratchet-wheels $j'$; but on the descent of the weight the rotary movement of the sheave-like pawls, plates, or arms J' and J² is imparted to the tables, which are thereby rotated, at each descent of the weight, through one-quarter of a revolution. During the raising of the weight by the action of the mechanism hereinbefore described a sufficient tension is maintained on the cord or chain H' to keep it taut, and the sheave-like pawl-arms J' and J² are returned from the full-line positions to the dotted-line positions (shown at Fig. 4) by the action of a pair of spring-boxes M and M', arranged on opposite sides or ends of the machine and connected with the said arms J' and J² by the cords or chains $m$ and $m'$, respectively.

The weight H is retained in its elevated position by the pawls N N', engaging with the periphery of the lower plates F of the tables, and no descent can take place until the release of the pawls. Such release is effected through the medium of linkage, as shown at Fig. 4, and the projecting lug $k^5$ on the disk K', which lug at a certain period engages with the bell-crank lever O and imparts to the same the necessary motion, which is transmitted through the links O' $O^2 O^3$ and bell-crank lever $O^4$ to the pawls N N'. The weight H is then free to descend and in so doing operates the pawl plates or arms J' J², and thus rotates the packing-tables through a quarter of a revolution against the action of the spring-boxes M M'.

To minimize shock and to prevent displacement of any of the parts by the too-rapid descent of the weight H, I mount on the platform A', adjacent to the peripheries of the plates F of the revolving tables, brake-pawls, as P P', which are kept in contact with the said plates by spring-plungers arranged in the casings or brackets $p\ p'$. In addition to acting as checks on the rotation of the tables the brake-pawls P P' also serve to prevent any accidental reverse rotation of the tables.

With the packing-tables and their operating mechanism constructed and arranged as hereinbefore described it will be understood that a complete revolution of the tables is effected in four stages with a sufficient pause between each stage to enable the whole of the operations of the machine to be effectually performed. The operations performed on each table are precisely similar.

A paper or other bag having a shell or liner, as G, within it is inserted in either of the tables at the position $f^a$ and supported by the bed-plate or platform A'. Such bag and liner are then moved through one-quarter of a revolution (by the action of the mechanism hereinbefore described) and so brought to the position $f^b$, which is immediately under the discharge-outlet of a suitable weighing-machine or charging apparatus. (Not shown in the drawings.) At this position the exact amount of material to be packed in one bag is run or charged into it. After such charging the table is moved through another quarter of a revolution to bring the bag, with its liner, to the position $f^c$ beneath the compressing-plunger $d$, which descends into the liner and compresses the substance to nearly the desired bulk. The compressing-plunger $d$ is attached to the lower end of the plunger-rod D, hereinbefore referred to, and is provided with a rubber or other elastic packing-ring $d'$, Fig. 12, which is expanded on the entry of the plunger into the liner G. The said expansion of the ring $d'$ is effected by the arrangement of a loose base-plate $d^2$, having a stem or tailpiece passing up the hollow center of the plunger-rod D. A lateral projection $d^3$ (passing through a slot in the rod D) from the said stem or tailpiece abuts against a lever $d^4$, pivoted on the exterior of the rod D. The position of the lever $d^4$ is horizontal, as shown, and its jointed end $d^5$ abuts against a projection $d^6$ from the side of the machine when the plunger $d$ first enters the shell; but as its descent is continued the lever becomes tilted to the position shown by dotted lines, and thus the stem of the base-plate $d^2$ is raised by the action of the cam-like central portion $d^{11}$ of the lever $d^4$ upon the projection $d^3$ a sufficient distance to compress the packing-ring $d'$ and so expand its periphery against the interior surface of the liner. When the plunger is near the completion of its stroke, the lever abuts against another projection $d^7$ from the framing of the machine, which returns it to a horizontal position, thus releasing the compression on the plunger-ring $d'$. On the return stroke of the plunger the jointed end $d^5$ of the lever $d^4$ will yield to permit the lever to pass above the projection $d^6$.

On the ascent or withdrawal of the plunger from the shell or liner the table is moved through the third quarter of a revolution, and the bag, with its contents, is thus brought to the position $f^d$ beneath the reciprocating ejecting-rod $D'$, which is so connected by linkage with the plunger-rod D as to move with the same. The linkage consists, preferably, of a lever Q, (shown by a dotted line and in three different positions at Fig. 2,) at $Q'$ to the frame or upright A and engaging at its free end with the rod $D'$, and a link $Q^2$, connecting the said lever Q with the rod D. By such ejecting-rod the bag and the compressed substance are together discharged from the shell or liner carried by the rotatable table and caused to pass through an aperture in the bed-plate or platform A into a receiving-box R beneath the table, where the substance is further compressed to the exact bulk required by the plunger $D^2$ on the end of the rod $D'$. The pair of receiving-boxes R beneath the respective rotating packing-tables are mounted upon a sliding or horizontally-reciprocating platform $R'$ and are each fitted with a false bottom. The reciprocation of the platform $R'$ is effected by the motion of the cam $R^2$ on the shaft K, such motion being transmitted through links $R^3$, $R^4$, and $R^5$. When by the action of the sliding platform $R'$ after the ascent of the ejecting-rod $D'$ the receiving-boxes R are drawn away clear of the said rods, the jaws at the lower ends of the rods $R^6$, projecting from the false bottoms of the respective receiving-boxes R, are brought into engagement with the ends of the levers $R^7$, mounted on a rocking shaft $R^8$, which is operated by the action of a projection $R^9$ from the cam $R^2$ on the bar $R^{10}$, arranged in connection with the lever $R^{11}$, mounted on the said shaft $R^8$. By the movement of the rocking shaft $R^8$ the false bottom of each receiving-box is forced up into the said box and lifts the package until its bottom is level with a receiving-trough S, (one of such troughs being arranged on each side of the machine,) onto which it is automatically pushed by the plates $S'$, attached to a sliding bar $S^2$, which is reciprocated by the action of a spring $S^3$ and a bell-crank lever $S^4$, operated from the revolving disk $S^5$ on the upper shaft B through the medium of the rod $S^6$. As each package is thus pushed onto the trough S the preceding package is automatically pushed by the rear package from the trough onto any ordinary conveyer. (Not shown in the drawings.)

At the upper end of each receiving-box R, I arrange devices for the automatic folding and closing of the mouth of the bag, such folding and closing operations being effected during the time of the conveyance of the package from the position of its ejection by the rod $D'$ to the discharge-trough S. A bag with the material packed therein is represented by an elevation and plan, respectively, at Figs. 13 and 14. The first operation necessary in the closing of the open upper end of the bag consists in the folding down of the two sides T and $T'$, and this is effected by the action of the reciprocating plates $t$ $t'$, which slide in opposite directions along the flanges or lateral brackets $r$, projecting from the upper ends of opposite sides of the receiving-box R.

On the movement of the box R, with its platform $R'$, in the direction indicated by the arrows at Figs. 9 and 10 the projections $t^2$ from the levers $t^3$, which are pivoted to the respective brackets $r$, strike the abutment-blocks, as $t^4$, pivoted, respectively, upon a portion of the standard $A^3$ and a bracket, as $t^5$, suspended from the bed-plate or platform $A'$ of the machine. As the movement of the box continues toward the completion of its stroke the said abutment-blocks $t^4$ cause the levers $t^3$ to turn upon their pivots and to assume such a position as is indicated by the center line 1 2 at Fig. 10. The plates $t$ $t'$ being connected by pegs, as $t^6$, with the slotted portion (see Fig. 10) of the respective levers $t^3$, such plates are caused by the aforesaid movement of the levers to advance onto the two sides T $T'$ of the upper part of the bag and to fold them down to the position indicated by the dotted lines at Fig. 13. When the levers $t^3$, with the box R, have sufficiently advanced to carry the pegs or projections $t^2$ clear of the abutment-blocks $t^4$, the said levers are immediately returned to their normal position by the action of the springs, such as $t^7$, and thus withdraw the plates $t$ $t'$. As the stroke or movement of the box R is continued in the aforesaid direction a projection U, mounted on one end of a spindle $U'$, extending across one side of the top of the box and upon which is mounted the folding-plate $U^2$, is brought into contact with the abutment-piece $U^3$, pivoted on the bracket $t^5$, and the said folding-plate $U^2$ is thereby rotated or turned down sufficiently for the folding of the upper end of the side $T^2$ of the bag to the position indicated by the dotted line at Figs. 14 and 15. The folding-plate $U^2$ is provided on its under or inner side with a felt or other pasting-pad $U^4$, which is supplied with paste or glue from a hopper or reservoir $U^5$, mounted on the upper or outer side of the plate. The return of the folding-plate $U^2$ when the projection U is clear of the abutment-piece $U^3$ is effected by the action of any suitably-arranged spring. To prevent adhesion of the gummed, pasted, or glued portion of the bag to the pad on the under side of the folding-plate $U^2$ on the return movement of such plate, I pivot a stripper-bar U⁶ upon the aforesaid spindle U′ and which on the ascent or return of the plate U² and pad U⁴ is retained in the position indicated at Fig. 11 by the engagement of one end of the bell-crank lever U⁷ with the notched pivot-boss of the stripper-bar, as shown at Fig. 11. The lever U⁷ is held up by the action of the spring U⁸. During the last portion of the stroke or movement of the box R in the direction indicated by the arrows at Figs. 9 and 10 the plate $u$ at the upper end of the box R is operated for the purpose of folding down the fourth side T³ of the bag onto the gummed, glued, or pasted portion T² beneath it. The completed package is shown by the isometric view at Fig. 16. The said folding-plate $u$ is mounted upon the spindle $u'$ and the necessary rotary movement is imparted to it through a quadrant $u^2$, having teeth gearing with the wheel or pinion $u^3$, fixed on the said shaft $u'$, as shown at Fig. 9ᴬ. The quadrant $u^2$ has a tailpiece $u^4$, which strikes (on its movement with the box R) the abutment-piece $u^5$, pivoted on the aforesaid bracket $t^5$, and thus the rotary movement of the spindle $u'$ is effected. The elevation of the stripper-bar U⁶ is accomplished during the descent of the folding-plate $u$ by the abutment of the lever $u^6$, mounted on one end of the spindle $u'$, against a projection from the link U⁹, supported by a stud U¹⁰, screwed into the side of the box R, the stud being passed through a slot in the link, as shown. As the link is connected with the bell-crank lever U⁷, its movement will effect the withdrawal of such lever from engagement with the hereinbefore-described notched pivot-boss of the stripper-bar U⁶, and the latter will then be raised by the action of a suitably-arranged spring. On the return stroke of the box R or its movement in the direction opposite to that indicated by the arrows at Figs. 9 and 10 the various abutment-pieces $u^5$, $t^4$, and U³ will spring back to permit the levers or projections to pass the same. By the last quarter of the revolution of the rotating tables the liner or shell is brought or carried from the position $f^d$ back to its starting position $f^a$, where the shell or liner is removed by the operator and replaced by another having a bag slipped over the same ready for a repetition of the packing operations in the succeeding revolution.

Although I preferably construct my machines of a duplex type having two rotatable tables each arranged with the necessary compressing and other mechanism, such as hereinbefore described, I sometimes construct a machine with but one table or with more than two tables, as may be necessary to meet the requirements of varying services.

Having thus described my invention, what I claim as new, and desire to secure by Letters Patent, is—

1. In machines for the packing of powdered or like substances in bags, the combination consisting of the reciprocating plungers and rods D D′, intermittently-rotating tables having perforated upper and lower plates F F′, a series of bags each having a liner G and moving with the said tables, a bag-supporting platform A′ having a discharge-aperture formed through it, and a package-receiving box R reciprocating beneath the said platform, substantially as set forth.

2. In machines for the packing of powdered or like substances in bags, the combination with a rotating table having perforated upper and lower plates F F′, of bags respectively fitting in the said perforations, each bag being provided with a detachable metallic liner G having abutment-pieces $g$ and a laterally-projecting lug $g'$, substantially as set forth.

3. In machines for the packing of powdered or like substances in bags, the combination with rotatable tables secured to the shafts E E′ which have each a ratchet-wheel $j'$ fixed thereon, of a weight H, flexible suspension-line H′, grip-wheel J, pawl-plates J′ and J² loosely mounted on the said shafts E and E′ respectively, each of the said pawl-plates having a spring-pawl $j$ pivoted thereon, the free ends of such pawls respectively engaging with the ratchet-wheels on the said shafts E and E′, substantially as set forth.

4. In machines for packing powdered and like substances in bags and in combination, rotatable tables, ratchet-wheels adapted to turn said tables, pawl-plates carrying pawls for engaging said ratchet-wheels, tension-cords connected to said pawl-plates, a weighted line engaging said pawl-plates, and acting in opposition to said tension-cords, and means for operating said pawl-plates against the tension of the weight comprising a rotatable line-grip wheel engaging said weighted line, an operating-disk having a projection, a bell-crank lever pivoted to a stationary part of the frame and adapted to be rocked by the projection on the disk, and a link connecting said bell-crank and line-grip wheel, substantially as described.

5. In machines for the packing of powdered or like substances in bags, the combination with the rotating tables having notched lower plates, of the pawls N N′ engaging said plates of the said tables, of a constantly-rotating disk K′ having a lug $k$ projecting laterally therefrom, the bell-crank levers O and O⁴, and the links O′, O², and O³, substantially as set forth.

6. In machines for the packing of powdered or like substances in bags, the combination with the plunger $d$ fixed to the lower end of the rod D, of an elastic ring $d'$, loose plate $d^2$ having a stem or tailpiece passing up the hollow center of the said rod D and with a lateral projection $d^3$ therefrom, lever $d^4$ pivoted on the exterior of rod D, and projections $d^6$ and $d^7$ from the framing of the machine, substantially as set forth.

7. In machines for packing powdered substances in bags, the combination with the intermittently-rotating packing-table, of a platform beneath the table, a receiving-box slidably mounted thereon, an operating-cam having connections to said box for reciprocating the same, a false bottom in said receiving-box having a rod depending therefrom, said rod having a slotted lower end, a lifting-lever for intermittently engaging and disengaging said slotted end of the rod, and means for operating said lifting-lever, substantially as described.

8. In machines for the packing of powdered or like substances in bags and having reciprocating boxes R into which the packages are discharged from intermittently-rotating packing-tables, and final receiving-troughs S, the combination with the said boxes R and troughs S, of push-plates S' attached to a bar $S^2$, spring $S^3$, bell-crank lever $S^4$, revolving disk $S^5$, and rod $S^6$, the said disk being provided with a laterally-projecting pin depressing during its revolution with the disk the said rod $S^6$ against the action of the said spring $S^3$, substantially as described.

9. In machines for the packing of powdered or like substances in bags, the combination with the upper end of a sliding receiving-box R, of the plates $t\ t'$ mounted on laterally-projecting brackets $r$, levers $t^3$ pivoted on the said brackets and each provided with a projection $t^2$, springs $t^7$, and pivoted abutment-blocks $t^4$ substantially as set forth.

10. In machines for the packing of powdered or like substances in bags, the combination with a sliding receiving-box R, and means for folding down three sides of the bags of a spring folding-plate $U^2$ for folding the other side mounted on a spindle $U'$ extending across one side of the top of the said box and provided with a projection U, and a pivoted abutment-piece $U^3$, substantially as set forth.

11. In machines for packing powdered and like substances in bags, a reciprocating box, means carried by the box for folding in two of the sides of the bags, successively-acting flaps hinged to said box for folding in the other two sides, pasting means carried by the first-acting flap, and devices whereby the reciprocation of the box operates said folding means, substantially as described.

12. In machines for packing powdered substances in bags the combination with the reciprocating bag-holding box, of oscillating folding-plates for folding two sides of the bag, a spring folding-plate having a pasting-pad and reservoir for folding and pasting the third side, a stripper-bar for holding the said third side down as the folding-plate rises, a second spring folding-plate for folding the fourth side down upon said pasted side and devices whereby the reciprocation of the box actuates all of said folding means, substantially as described.

13. In machines for packing powdered substances in bags the combination with the reciprocating bag-holding box, and bag-folding means including two successively-acting folding-plates and a pasting-pad carried by the first-acting plate, of a retaining-lever, means for holding said retaining-lever down upon the bag while the folding-plate and pad rises, means operated by the movement of the succeeding folding-plate for releasing said retaining-lever and devices whereby the reciprocation of the box operates said folding means, substantially as described.

In witness whereof I have hereunto set my hand in presence of two witnesses.

ARTHUR SMITH.

Witnesses:
EDWARD MARKS,
HERBERT BOWKETT.